United States Patent [19]
Kellermeier et al.

[11] 3,865,964
[45] Feb. 11, 1975

[54] COATING THE SURFACE OF FROZEN, FRIED FRENCH FRIES WITH ATOMIZED FAT GLOBULES

[75] Inventors: Robert J. Kellermeier; James T. Knight; Bernadine E. Steljes, all of Ontario, Oreg.

[73] Assignee: Ore-Ida Foods, Inc., Ontario, Oreg.

[22] Filed: June 8, 1973

[21] Appl. No.: 368,191

Related U.S. Application Data
[62] Division of Ser. No. 124,271, March 15, 1971.

[52] U.S. Cl.................. 426/307, 426/347, 426/438, 426/524
[51] Int. Cl.............................................. A23b 7/00
[58] Field of Search .......... 426/302, 303, 307, 438, 426/439, 441, 524, 291, 293, 347

[56] References Cited
UNITED STATES PATENTS

| | | | |
|---|---|---|---|
| 2,976,153 | 3/1961 | Arenson | 426/310 |
| 3,044,880 | 7/1962 | Bogyo | 426/438 |
| 3,078,172 | 2/1963 | Libly | 426/95 |
| 3,169,069 | 2/1965 | Hanson | 426/291 |
| 3,355,299 | 11/1967 | McLaughlin | 426/441 |
| 3,397,993 | 8/1968 | Strong | 426/441 |
| 3,423,213 | 1/1969 | Vahlsing | 426/524 |
| 3,484,252 | 12/1969 | Popeil | 426/438 |
| 3,653,924 | 4/1972 | Renton | 426/293 |
| 3,748,153 | 7/1973 | Herbert | 426/302 |

Primary Examiner—A. Louis Monacell
Assistant Examiner—Martin G. Mullen
Attorney, Agent, or Firm—Mallinckrodt & Mallinckrodt

[57] ABSTRACT

A frozen French fry potato product is made by applying to exterior surfaces of partially fried French fries or the like, that have been frozen, a thin coating of fat which enables oven reconstitution by the consumer to simulate deep fat frying. Such coating is preferably applied by spraying minute globules of liquid oil or fat onto the frozen surfaces, resulting in a discontinuous but substantially uniform and visually unobtrusive coating of solidified oil or fat globules superficially adherent to such surfaces.

2 Claims, 2 Drawing Figures

PATENTED FEB 11 1975  3,865,964

COATING THE SURFACE OF FROZEN, FRIED FRENCH FRIES WITH ATOMIZED FAT GLOBULES

This is a division of application Ser. No. 124,271, filed Mar. 15, 1971.

BACKGROUND OF THE INVENTION

1. Field

The invention is in the general field of potato food products and of methods and apparatus for producing them and is particularly concerned with frozen French fries and the like, e.g., "shoe string" potatoes, as customarily packaged and sold in partially prepared condition to housewives, restaurants, and other consumers for rapid reconstitution.

2. State of the Art

French fries are presently packaged and sold in frozen, partially prepared condition for reconstitution immediately prior to being served. A busy housewife usually is not equipped for deep fat frying, especially one who buys the frozen product for convenience. In most instances, the product as purchased is placed in an oven in the frozen state and is heated to a temperature adequate for reconstitution. However, the oven-reconstituted product is by no means the equivalent of the original. This is so because the desirable dehydration of surface areas of the potatoes that took place during the initial frying in deep fat is counteracted by moisture migrating from the center, without the compensating crisping effect of deep fat frying. This tends to make the reconstituted product limp and soggy. Moreover, such reconstituted French fries do not acquire the golden brown color of those completely deep fried in the normal manner. Thus, reconstituted frozen French fries of the type normally produced do not have the color, flavor, nor crispness customarily expected of French fries and are generally a disappointment to the purchaser.

3. Objective

In the making of the present invention, it was a principal object to provide frozen, partially prepared French fries capable of reconstitution in the oven to a condition more nearly equivalent to freshly deep-fat fried French fries than had heretofore been possible.

SUMMARY OF THE INVENTION

In accordance with the invention, partially prepared French fries or the like are produced and frozen in conventional manner. Thereafter, liquid or semi-liquid oil or fat is applied to surfaces of the frozen fries, usually and advantageously by atomization spraying. The applied oil or fat congeals on and adheres to the frozen potato surfaces as preferably a thin, superficial, substantially uniform coating of solidified oil or fat. Upon thawing and oven-heating these so-treated fries, the superficial coating of fat melts and provides an environment sufficiently similar to deep-fat frying to prevent the usual undesirable results of oven heating. The resulting product has more nearly the color, flavor, and crispness of freshly deep fat fried French fries than has been possible heretofore without actually resorting to deep fat frying for reconstitution purposes.

Although the method of the invention is especially advantageous in connection with frozen, deep fat fried French fries or the like produced directly from freshly cut whole potatoes, it may also be applied to frozen fries extruded to shape from mashed potato mixes or the like.

THE DRAWING

An embodiment of apparatus for carrying out the method and an embodiment of the French fry product representing the best mode presently contemplated for carrying out the invention are illustrated in the accompanying drawing, in which:

FIG. 1 is a somewhat schematic view in side elevation and partly vertical section of apparatus for carrying out a fat or oil spraying operation on frozen, deep-fat fried French fries prior to packaging; and FIG. 2, a perspective view of a typical frozen, deep fat fried French fry conforming to the invention.

DETAILED DESCRIPTION OF ILLUSTRATED EMBODIMENT

Figures 1, 2:
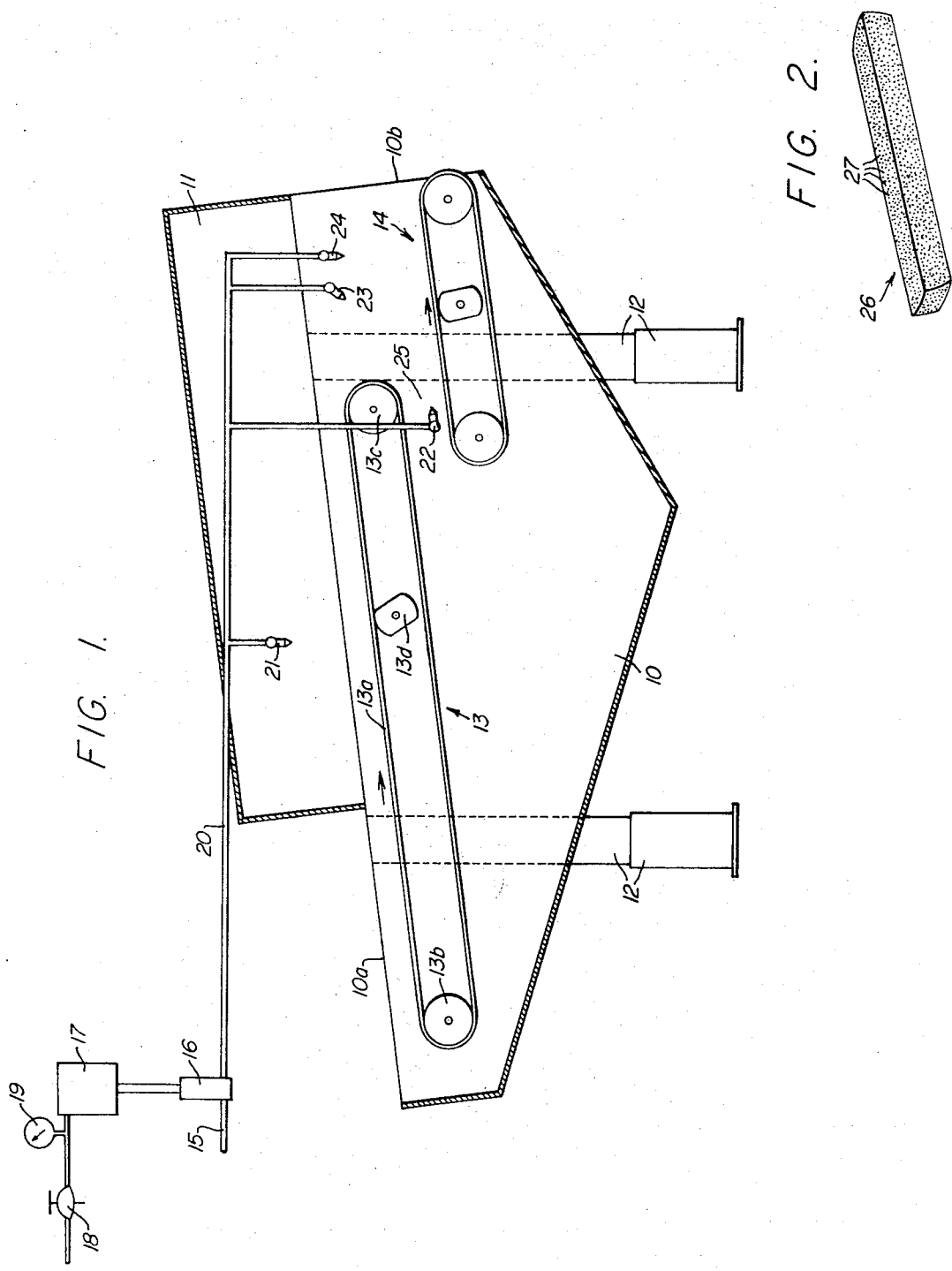

In carrying out the method of the invention, it is advantageous to use apparatus of the general type illustrated in FIG. 1.

An elongate stationary vessel 10, having a large part of its open top 10a protectively covered by a hood 11, is supported by sturdy legs 12. A conveyor, such as the endless belt conveyor shown at 13 and comprising a stainless steel wire mesh belt 13a trained about head and tail pulleys 13b and 13c, respectively, extends from a receiving end below open top 10a to a discharge end below hood 11 and has an eccentric roller 13d intermediate its length to vibrate the upper, carrying run of the belt. At a lower level in vessel 10, a second conveyor 14 of similar character has its receiving end disposed under and spaced below the discharge end of conveyor 13 for catching material dropped from such discharge end of the conveyor. Conveyor 14 extends to or through open end 10b of vessel 10 to a product-handling location.

Oil or fat in liquid or semi-liquid condition is fed through a supply pipe 15 to the pumping chamber 16 of a piston pump 17 powered by pressurized air supplied from any suitable source (not shown) under a control of a pressure regulator 18 and pressure gauge 19. The pressurized oil or fat is passed through a piping system 20 to several spray nozzles, 21, 22, 23, and 24, which discharge fine atomized sprays of the oil or fat. One of the nozzles, 21, is located above conveyor 13 and is directed downwardly toward the top of the upper run of belt 13a, preferably immediately above eccentric roller 13d; two others, 22 and 23, are at opposite sides, respectively, of the space 25 between conveyors 13 and 14, and are directed toward such space; another, 24, is above conveyor 14 and is directed downwardly toward the top of the upper run thereof.

In operation, frozen, deep-fat fried French fries or the like are loaded on conveyor 13 through opening 10a and travel under the first spray nozzle 21 while being agitated by the vibrating action of eccentric roller 13d. They are discharged into space 25, where they tumble through sprays coming from opposite directions from the next two spray nozzles 22 and 23. Finally, after dropping onto conveyor 14, they pass under the spray coming from the last nozzle 24. Upon discharge at the product-handling location, the surfaces of the frozen fries, see the French fried potato 26, FIG. 2, are discontinuously but substantially uniformly coated with multitudinous, minute and solid globules or droplets 27 of the atomized oil or fat that firmly adhere to the frozen surfaces of the fries.

Although various edible oils and fats can be utilized for the purpose, it is preferred to use 100 percent soybean oil that has been partially hydrogenated. Heating of the oil or fat prior to introducing it into the spraying system will ensure atomizing fluidity. Temperature is typically within the range of about 100° to about 250°F. An amount of oil or fat sufficient to accomplish the purposes of the invention is applied to the exterior surfaces of the frozen French fries. There must be sufficient to enable the exterior surfaces of the fries to attain higher temperatures in the oven than they normally would, so as to promote dehydration of the exterior crust and achieve crispness. Also, there must be sufficient to seal the voids created by moisture loss during the earlier partial frying so as to prevent rapid migration of moisture from the interior of the fries to the outer crust, which makes for sogginess. The amount present must be sufficient to reduce evaporation and retain heat interiorly of the potato and to, in effect, immerse the fries in fat to develop true French fry flavor and color. It must also be sufficient to tenderize the surface crust and produce a "buttering" effect by absorption of fat.

The addition of oil or fat in the amount of about 1.0 percent by weight of the frozen, deep fat fried French fries is satisfactory as a minimum for accomplishing the above purposes. Up to about 6 percent by weight can be economically and usefully applied for the purpose, although in instances of larger cuts even a greater amount can be applied without waste. From 3.5 to 4.5 percent is preferred for regular French fries, somewhat more for crinkle cuts, and from 2.5 to 3.5 percent for shoestring cuts. The amount is generally determined on the basis of surface area of the individual potato pieces.

Application of the oil or fat by atomized sprays is the most effective way to achieve substantially uniform distribution of the relatively small amounts that are preferably utilized to effect the purposes of the invention. The atomized globules or droplets adhere to the frozen surfaces of the individual fries as a thin, discontinuous but substantially uniformly distributed coating and provide the desired deep fat frying environment for each potato piece during oven reconstitution of the frozen product.

The individual solidified globules or droplets of oil or fat are preferably about 0.1 millimeter or less in diameter so as to, in effect, constitute a fog or mist of the oil or fat and to achieve most effective distribution thereof over the surfaces of the potato pieces within the preferred quantitative ranges. For accomplishing this, utilizing the preferred partially hydrogenated soybean oil, spraying pressures of from about 30 to about 400 p.s.i.g. are normally employed depending upon the type of nozzles utilized and the type and temperature of the oil or fat. In any given instance the variables are so adjusted that the desired quantity of oil or fat is applied to the particular frozen deep fried potato pieces concerned.

The individual globules normally solidify within about 10 seconds after application to the frozen surfaces of the potato pieces. Some of the globules may inevitably coalesce before solidification. This is not detrimental.

It should be realized that the particular pumping system illustrated is only one way in which effective atomization of the oil or fat may be attained, also, that the number of spray nozzles at any of the specified locations depends upon the width of the conveyor and the type of spray nozzle utilized.

As used herein and in the claims, the term "deep fat" and "fat" alone are intended to include all types of frying oils and fats, although those that solidify readily on cooling are preferred.

Whereas there are here illustrated and described particular product characteristics, procedures, and apparatus presently contemplated to be the best mode of carrying out the invention, it should be realized that the scope of the invention is not limited thereto.

We claim:

1. A method of producing a frozen French fry potato product, comprising deep fat frying French fry potato pieces; freezing said fried French fry potato pieces; atomizing liquid fat using spraying pressures of about 30 to about 400 psig onto the surfaces of said frozen fried French fry potato pieces in an amount of about 1 to about 6 percent by weight of said frozen, fried French fry potato pieces to provide a superficial, discontinuous coating of solidified globules or droplets of said atomized fat adherent to the frozen surfaces of said frozen fried French fry potato pieces.

2. A method according to claim 1, wherein the discontinuous coating of solidified globules or droplets of fat is substantially uniformly distributed over the frozen surfaces of the individual potato pieces.

* * * * *

UNITED STATES PATENT OFFICE
CERTIFICATE OF CORRECTION

Patent No. 3,865,964      Dated February 11, 1975

Inventor(s) Robert J. Kellermeier, James T. Knight and Bernadine E. Stelljes

It is certified that error appears in the above-identified patent and that said Letters Patent are hereby corrected as shown below:

The name of the third inventor is Bernadine E Stelljes.

Correction is made in the cover page of the patent, Column 1, line 5.

Signed and Sealed this fifth Day of August 1975

[SEAL]

Attest:

RUTH C. MASON
*Attesting Officer*

C. MARSHALL DANN
*Commissioner of Patents and Trademarks*